United States Patent
Court et al.

(10) Patent No.: US 6,199,342 B1
(45) Date of Patent: Mar. 13, 2001

(54) METHOD FOR FORMING STRUCTURE SUITABLE FOR USE AS A CORE MEMBER

(75) Inventors: Calvin L. Court; Tawne L. Castorina, both of Texarkana; Calvin L. Court, Wake Village; Melvin T. Court, Texarkana, all of TX (US)

(73) Assignee: Newcourt, Inc., Texarkana, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,173

(22) Filed: Feb. 17, 1998

(51) Int. Cl.[7] ........................................................ E04C 2/34
(52) U.S. Cl. ........................ 52/664; 52/799.1; 52/799.11; 52/799.12; 29/897.31
(58) Field of Search ............................ 29/897.31; 52/664, 52/799.1, 799.11, 799.12

(56) References Cited

U.S. PATENT DOCUMENTS

| | | |
|---|---|---|
| 1,708,462 | 4/1929 | Bodman . |
| 2,369,006 | 2/1945 | Banks . |
| 2,477,852 | 8/1949 | Bacon . |
| 3,234,639 | 2/1966 | Dietzsch . |
| 3,616,022 | 10/1971 | Somerville . |
| 3,625,102 | 12/1971 | Shino . |
| 3,664,906 | 5/1972 | Hartig . |
| 3,773,584 | 11/1973 | Dietzsch et al. . |
| 3,792,562 | 2/1974 | Gilliam . |
| 3,877,690 | 4/1975 | Owens . |
| 3,951,022 | 4/1976 | Hurtes . |
| 4,155,800 | 5/1979 | Wilson . |
| 4,250,687 | 2/1981 | Lueneberg et al. . |
| 4,276,249 | 6/1981 | Holladay . |
| 4,351,680 | 9/1982 | Kohn . |
| 4,588,543 | 5/1986 | Huebner . |
| 4,606,960 | 8/1986 | Angel et al. . |
| 4,665,679 | 5/1987 | Watanabe . |
| 4,755,408 | 7/1988 | Noel . |
| 5,032,208 | 7/1991 | Strauss . |
| 5,240,540 | 8/1993 | Matsumoto et al. . |
| 5,251,420 | * 10/1993 | Johnson ................................. 52/664 |
| 5,658,644 | 8/1997 | Ho et al. . |
| 5,683,782 | 11/1997 | Duchêne . |

FOREIGN PATENT DOCUMENTS

| | | |
|---|---|---|
| 670.027 | 9/1965 | (BE) . |
| 435 693 | 11/1967 | (CH) . |
| 1 209 725 | 1/1966 | (DE) . |
| 1209725B | 1/1966 | (DE) . |
| 2 129813 | 12/1971 | (DE) . |
| 28 36 031 | 2/1980 | (DE) . |
| 0326928A | 8/1989 | (EP) . |
| 0368238A | 8/1990 | (EP) . |
| 0297945A | 7/1993 | (EP) . |
| 1.310.591 | 10/1961 | (FR) . |
| 891110 | 3/1962 | (GB) . |
| 2 059 802 | 4/1981 | (GB) . |
| 57-184065A | 11/1982 | (JP) . |
| 037956 | 8/1987 | (JP) . |

* cited by examiner

Primary Examiner—Carl D. Friedman
Assistant Examiner—Phi Dieu Tran A
(74) Attorney, Agent, or Firm—Jenkens & Gilchrist, A Professional Corporation

(57) ABSTRACT

Core-type structures are formed by extruding elongated tubular members or sheets of a thermoplastic material that are subsequently cut into segments or plates having a defined length and then assembled into a bundle. The bundle is then simultaneously cut at a number of spaced-apart locations along the length of the bundled segments, or plates, whereby a plurality of separate core structures are simultaneously formed.

7 Claims, 6 Drawing Sheets

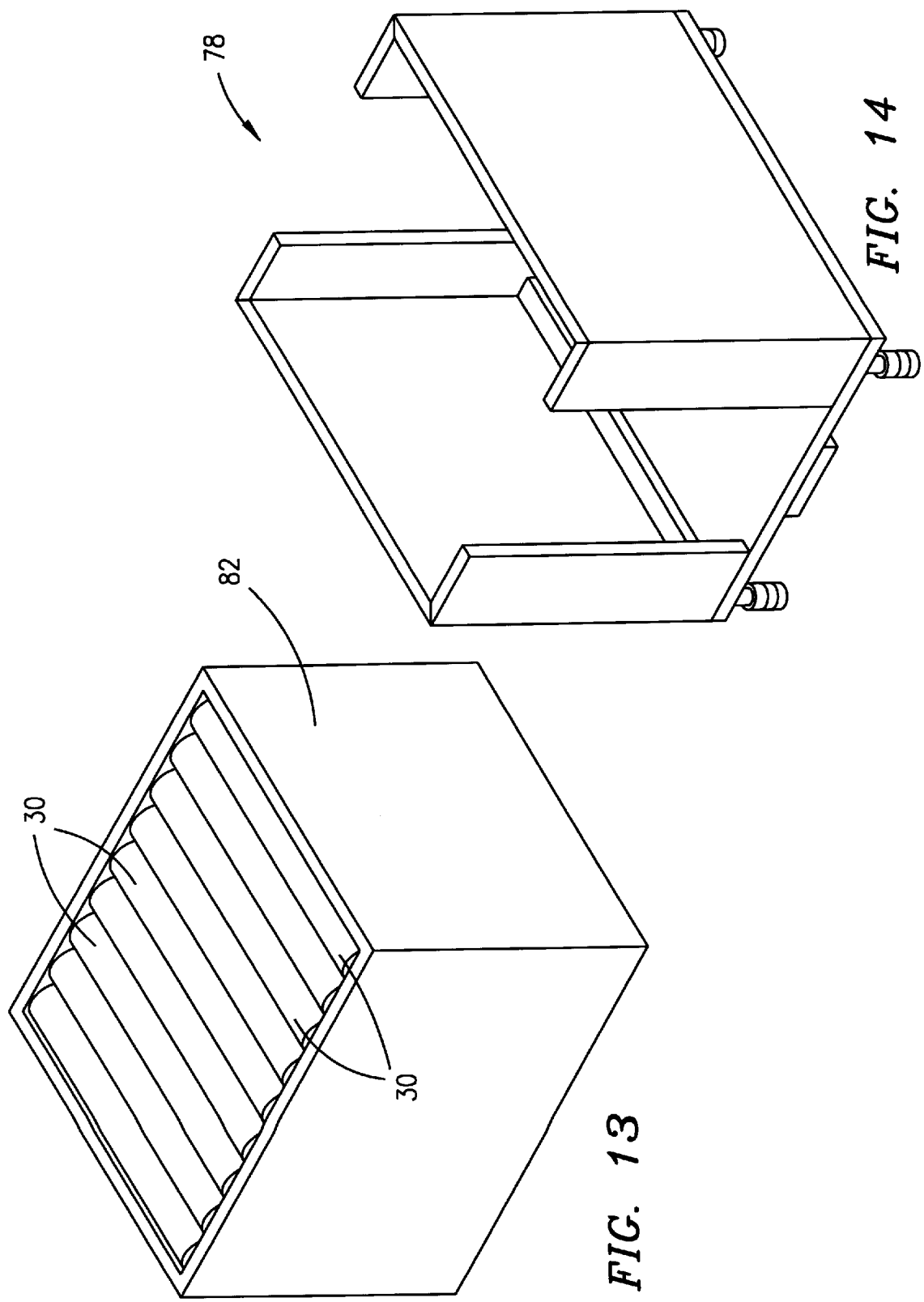

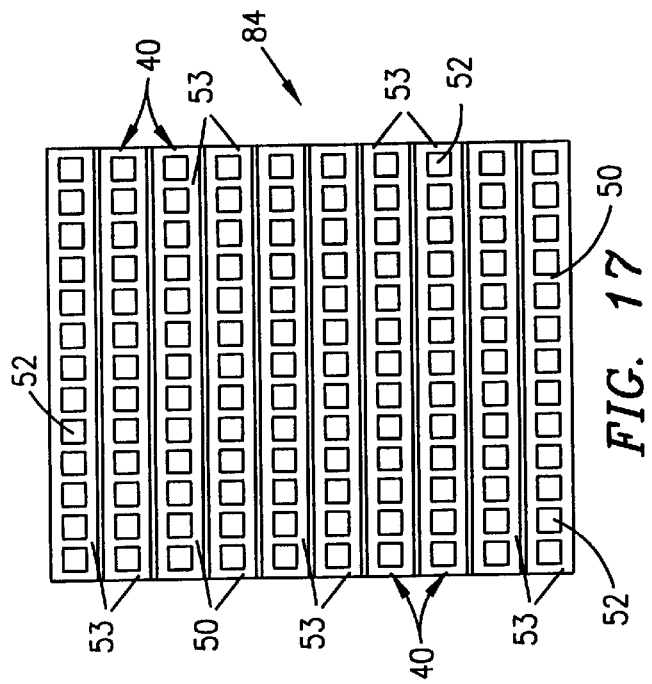
FIG. 17
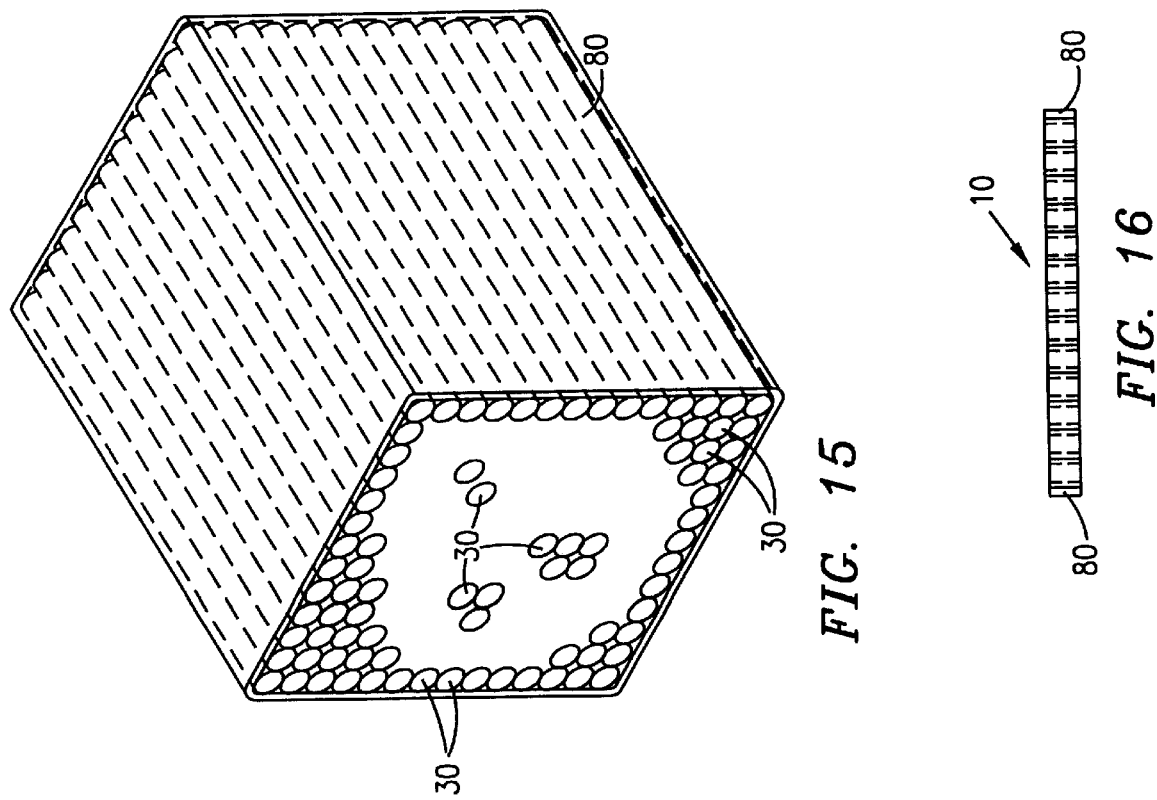
FIG. 15
FIG. 16

METHOD FOR FORMING STRUCTURE SUITABLE FOR USE AS A CORE MEMBER

BACKGROUND OF THE INVENTION

1. Technical Field

This invention relates generally to a method for forming a structure suitable for use as a core member, either by itself or as part of a multi-ply panel, and more particularly to a method for forming such a structure having a plurality of elongated passageways disposed parallel to the thickness of the core structure.

2. History of Related Art

Many structural arrangements have been proposed for use as a core member in laminated assemblies such as multi-ply panels having a surface ply bonded to at least one side of the core member. In particular, core structures formed of short elongated tubular segments arranged in parallel to the thickness of the core member have been found to provide exceptional resistance to compressive deformation and crush damage. However, because such structures comprise very large numbers of separate tubes or similar cell components, they have heretofore been difficult to assemble and manufacture economically. For example, U.S. Pat. No. 5,032,208, issued Jul. 16, 1991 to Horst Strauss describes a process for manufacturing a bundle of tubes by loading the tubes into a gutter having a moveable end wall. The end wall is then moved incrementally to expose one end of the tubes, which are then cut and the cut ends fused whereby adjacently disposed tube ends are joined together. The bundle is then moved to a position whereat a second cut can be made, then moved to a position at which a third cut can be made, and continued, seriatim, until the entire bundle has been cut into the desired number of cores. The Strauss process is not only cumbersome, allowing only one transverse cut and fusing operation at a time, but also is dependent upon precise, controlled movement of one end of the gutter while maintaining a desired alignment of the uncut tubes in the bundle.

In an earlier arrangement, a structural core panel construction is described in U.S. Pat. No. 2,477,852, issued Aug. 2, 1949 to C. E. Bacon, in which short tubular members are adhesively joined along their entire length. Alternatively, other shapes, such as corrugated strips may be precisely aligned and adhesively joined together along mating corrugations and then transversely cut to provide a core. In all of the arrangements taught in the Bacon structure, the individual components are adhesively joined along their entire length. This process is also cumbersome and time consuming, requiring that the adhesive be set before moving the structure for subsequent processing, such as applying a cover to the core member.

Recently, U.S. Pat. No. 5,683,782 issued Nov. 4, 1997 to Rainer Duchene describes a process for producing a honeycomb structure in which the individual components of the structure are coated with a heat-activated adhesive prior to assembly. After assembly, the adhesive is activated by a thermal treatment in which the individual components are bonded along their entire length. Thus, the Duchene process requires a precoating step prior to assembly and a separate thermal treatment prior to subsequent processing.

The present invention is directed to overcoming the problems set forth above. It is desirable to have a method for forming a structure suitable for use as a core in which a plurality of cores may be formed by simultaneous multiple cuts of a preassembled stack, or bundle, of components having internal passageways. It is also desirable to have such a structure that does not require adhesive joining of the separate components prior to forming into a core member. Furthermore, it is desirable to have a method by which a structure suitable for use as a core member can be formed without requiring a fixture having a moveable end wall by which only a single core member is formed before requiring movement of the assembled tubes to a subsequent position at which another core may be formed. Moreover, it is desirable to have a method for forming a plurality of cores simultaneously by which only selected open ends of the elongated members forming the core are fused together.

SUMMARY OF THE INVENTION

In accordance with one aspect of the present invention, a method of forming a structure suitable for use as a core member includes extruding a thermoplastic material into an elongated tubular shape, cutting the elongated tubular shape into a plurality of separate segments, and then aligning the separate segments in side-by-side relationship along their lengths. The aligned segments are then formed into a row having a preselected width, after which the rows are assembled one on top of another to form a stack of the rows. Thus the stack has a width substantially equal to the width of the rows of aligned segments, a depth substantially equal to the length of the segments, in the rows, and a height determined by the number of rows of aligned segments assembled in the stack. The stack of assembled rows is then cut in a direction transverse to the longitudinal axes of the aligned segments at a plurality of preselected spaced-apart distances, forming a plurality of separate cores each of which has a width and height substantially equal to the width and height of the stack and a thickness determined by the preselected distance between the transverse cuts. Simultaneously with cutting the stack of assembled rows, the aligned segments are fused to each other at at least one of the respective cut ends of the segments.

In other aspects of the present invention, the elongated tubular shape may have a hollow circular cross section, a hollow rectangular cross-section, a hollow triangular cross-section, a hollow hexagonal cross-section, or may have at least one transversely disposed internal wall forming a plurality of separate elongated hollow cells extending along the length of each of the tubular shapes. Other features of the method for forming a structure, in accordance with the present invention, include in the aligning step also moving the segments along a guideway having sidewalls that converge to a spaced-apart distance substantially equal to the length of the segments, and agitating at least one of the segments or the guideway during movement of the segments along the guideway. Other features of the method of forming a row of aligned segments also include fusing at least one of the cut ends of each of the aligned segments to the cut end of at least one adjacently disposed segment. The fusing of the cut ends may include heating the ends to a temperature sufficient to at least partially melt the cut ends of the aligned segments or mechanically bonding at least one of the cut ends of the aligned segments to the cut end of at least one adjacently disposed segment.

Yet another feature of the method of forming a structure, in accordance with the present invention, includes cutting the stack of assembled rows of aligned segments by making a plurality of simultaneous transverse cuts at spaced-apart distances along the longitudinal axes of the segments.

In accordance with another aspect of the present invention, the method of forming a structure suitable for use as a core member includes extruding a continuous thermoplastic sheet having a predefined width, at least one surface extending across the width of the sheet, and a plurality of parallel elongated passageways in which each of the elongated passageways has a longitudinal axis perpendicular to the width of the sheet. The extruded thermoplastic sheet is cut across its width to form a plurality of separate plates, each having a preselected length. The separate plates are assembled one on top of another to form a stack of plates in which the elongated passageways in each plate are arranged in a common parallel direction perpendicular to the width of the stack. The stack has a width substantially equal to the width of the plates, a depth substantially equal to the preselected length of the plates, and a height determined by the number of plates assembled in the stack. The stack of assembled plates is then cut in a direction transverse to the longitudinal axes of the elongated passageways at a plurality of preselected spaced-apart distances along the axes. The cutting of the stack in this manner forms a plurality of separate structures, each having a width and height substantially equal to the width and height of the stack and a thickness determined by the preselected distance between the transverse cuts through the stack. The method further includes simultaneously fusing adjacently disposed plates to each other at at least one of the respective cut ends of the plates, simultaneously with cutting of the stack.

Other features of the method for forming a structure in accordance with the method immediately set forth above includes the elongated passageways having a selected one of a number of cross sections, including the cross-sectional shapes enumerated above. Furthermore, the elongated passageways may be at least partially formed by a base wall having a first side defined by a surface extending across the width of the thermoplastic sheet, and a plurality of spaced-apart parallel walls extending from a second side of the base wall in a direction normal to the base wall. Also, the elongated passageways may be defined by a plurality of adjacently disposed U-shaped channels wherein the bottoms of the U-shaped channels define a surface extending across the width of the thermoplastic sheet. In yet another arrangement, the surface extending across the width of the thermoplastic sheet may be defined by one side of a serpentine wall, and the elongated passageways defined by alternating convex and concave curved portions on respective sides of the serpentine wall. Other features of the method of forming a structure, as set forth above, include the step of simultaneously fusing adjacently disposed plates to each other by heating at least one of the cut ends of each of the plates to a temperature sufficient to at least partially melt the respective cut ends whereupon, on cooling, the cut ends are mutually fused together.

Other features of assembling of the plates includes the stacking of the plates in a structure having openings provided therein that are adapted to provide access to the stack of plates for the purpose of wrapping at least one band of a heat-shrinkable plastic material around the stack. Still other features of the method include cutting the stack of assembled plates by making a plurality of simultaneous cuts at spaced-apart distances in a direction along the longitudinal axes of the passageways of the plates.

In yet another aspect of the present invention, a method of forming a structure suitable for use as a core member includes extruding a thermoplastic material into an elongated tubular shape, cutting the elongated tubular shape into a plurality of separate segments and aligning the separate segments in side-by-side relationship along their preselected lengths. The plurality of aligned separate segments is then shrink-wrapped, with the shrink wrapping surrounding the aligned separate segment and forming a bundle of shrink-wrapped segments. The shrink-wrap bundle is then cut in a direction transverse to the longitudinal axes of the segments, thereby forming a plurality of separate shrink-wrapped structures, each of having a thickness determined by the preselected distances between the transverse cuts. At least one of the cut ends of the respective segments is simultaneously fused with an adjacently disposed aligned segment in the bundle during the cutting operation. Other features of the immediately above-described method of forming a structure include the elongated tubes having a cross section such as those previously described.

In still another aspect of the present invention, a method of forming a structure suitable for use as a core member includes extruding a thermoplastic material into an elongated tubular shape, cutting the elongated tubular shape into a plurality of separate segments, and aligning a plurality of separate segments in side-by-side relationship along their lengths. The aligned separate segments are then deposited into a consumable container formed of a material that is capable of being cut by a thermal apparatus. The consumable container and the aligned segments deposited within the container are cut in a direction transverse to the longitudinal axes of the aligned segments at a plurality of preselected spaced-apart distances along the longitudinal axes of the segments. This forms a plurality of separate cores, each having a thickness determined by the preselected distance along the transverse cuts. Simultaneously with cutting through the deposited separate segments and the consumable container, adjacently disposed aligned segments are simultaneously fused to each other at at least one of the cut ends of the respective segments.

Other features of the method of forming a structure, in accordance with the immediately above description, includes the consumable container being formed of expanded polystyrene. Additional features include the consumable container being disposed within a structure having openings provided therein that are adapted to provide access to the container containing the plurality of segments for the purpose of wrapping at least one band of a plastic material around the consumable container.

Still other methods include cutting of the deposited separate segments and the consumable container by making a plurality of simultaneous cuts, desirably by heated wires, at spaced-apart distances along the longitudinal axes of the segments.

In accordance with another aspect of the present invention, a member suitable for use as a core has a pair of spaced-apart surfaces defining the thickness of the member. The member also has a plurality of adjacently disposed rows of a thermoplastic sheet structure, with the rows being disposed in a direction parallel with the thickness of the member. Each row of the thermoplastic sheet structures have a defined width, at least one surface extending across the width, and a plurality of elongated passageways disposed in parallel relationship with the aforementioned surface and with each other. Each of the elongated passageways have a longitudinal axis oriented perpendicular to the direction of the width of the sheet. A portion of the at least one surface is fused with a portion of the at least one surface of an adjacently disposed row of the thermoplastic sheet structures.

Other features of the member suitable for use as a core include the fused portions of the respective surfaces being positioned at at least one of the pair of spaced-apart surfaces defining the thickness of the member. Also, the elongated passageways may have any of a number of hollow cross sections, including rectangular, triangular, circular, hexagonal, or may have at least one transversely disposed internal wall which forms a plurality of separate elongated hollow cells extending along the length of each of the passageways.

BRIEF DESCRIPTION OF THE DRAWINGS

A more complete understanding of the structure and operation of the present invention may be had by reference to the following detailed description when taken in conjunction with accompanying drawings:

FIG. 13 is three-dimensional view of an alternative embodiment of the method embodying the present invention, in which elongated segments are aligned within a consumable box;

FIG. 14 is a three-dimensional view of a structure for holding a plurality of cut segments in the course of carrying out an embodiment of the method of forming a structure suitable for use as a core member in accordance with the present invention;

FIG. 15 is a three-dimensional view of a heat-shrink wrapped bundle of tubes in accordance with one aspect of the method of forming a structure embodying the present invention;

FIG. 16 is a side view of a structure suitable for use as a core member, formed in accordance with the method of the present invention in which heat-shrinkable plastic film encases the bundle as shown in FIG. 15; and FIG. 17 is a plan view of a structure, embodying the present invention, that is suitable for use as a core member.

DETAILED DESCRIPTION OF PRESENTLY PREFERRED EXEMPLARY EMBODIMENTS

Figure 1:
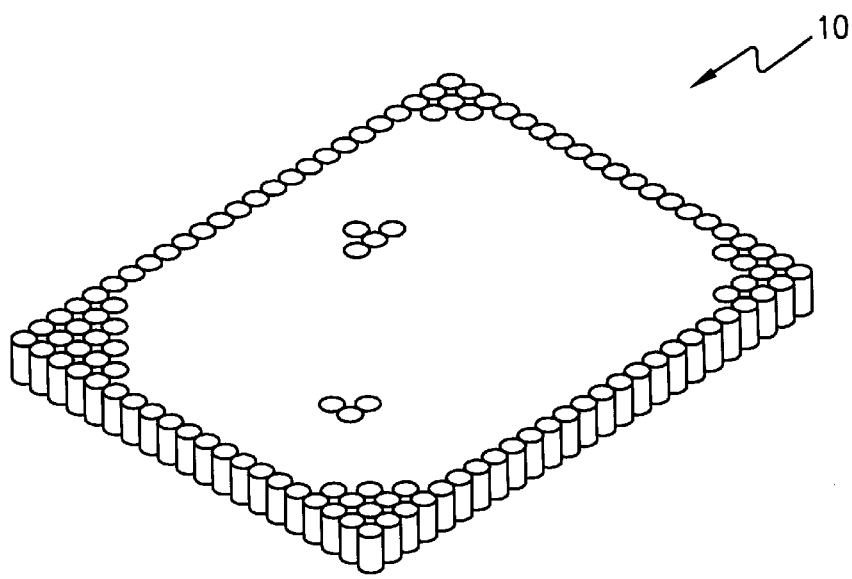
FIG. 1 is a three-dimensional view of a structure suitable for use as a core member, made in accordance with the method embodying the present invention.

The present invention is described by reference to various embodiments of a method for forming a structure 10, as shown in FIG. 1, suitable for use as a core member, e.g., such as the cores used in multi-ply panels, various laminated panel constructions, or as stand-alone structural members. Such cores and panels are used in many fields, such as transportation, housing, marine, architectural, and other fields. The structure 10 is typically used as a core on which a planar panel is applied to one, or usually, both sides of the structure 10. The planar panels may be plywood, aluminum or other metal, plastic, fiberglass, fabric such as found in wall coverings, and carpeting, or other material.

Figure 2:
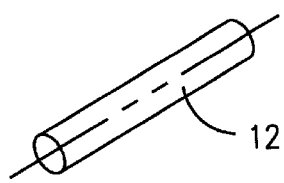
FIG. 2 is a three-dimensional view of an elongated tubular shape having a hollow circular cross-section.
Figure 3:
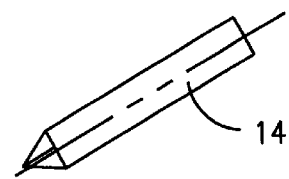
FIG. 3 is a three-dimensional view of an elongated tubular shape having a hollow triangular cross-section.
Figure 4:
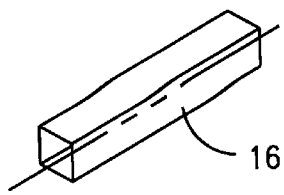
FIG. 4 is a three-dimensional view of an elongated tubular shape having a hollow square cross-section.
Figure 5:
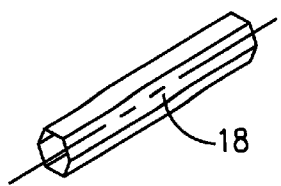
FIG. 5 is a three-dimensional view of an elongated tubular shape having a hollow hexagonal cross-section.
Figure 6:
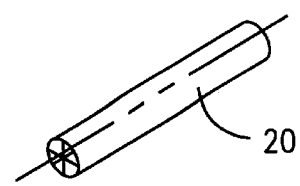
FIG. 6 is a three-dimensional view of an elongated tubular shape having a plurality of transversely disposed internal walls which form a plurality of separate elongated hollow cells extending along the length of the elongated tubular member.

As shown in FIGS. 2–6, in one arrangement of the structure 10, short sections of an elongated tubular shape are arranged normal to the broad surfaces of the panel and, due to their short columnar length, advantageously exhibit high strength along the longitudinal axes of the short columns. Although a circular shape 12 having a substantially uniform wall thickness and open cross-sectional area along its length, as shown in FIG. 2, is used in the following description of the preferred exemplary embodiments of the method for forming a structure 10, other shapes having a substantially uniform open cross-sectional area along their respective lengths such as a tubular member 14 having a hollow triangular cross section as shown in FIG. 3, a tubular member 16 having a hollow square cross section, as shown in FIG. 4, a tubular member 18 having a hexagonal cross section, as shown in FIG. 5, or a tubular member 20 having one or more transversely disposed internal walls which form a plurality of separate elongated hollow cells extending along the length of the tubular member 20, as shown in FIG. 6. Moreover, if the tubular member 20 is not formed by extrusion, it may have a non-uniform cross section, i.e., the cross-sectional area may vary along its length to form tapered segments. In carrying out the method embodying the present invention, it is particularly desirable that the elongated tubular members be formed of a thermoplastic material such as polyethylene, polypropylene, polyvinyl chloride, or other thermoplastic material suitable for high forming rate extrusion processing.

Figure 7:
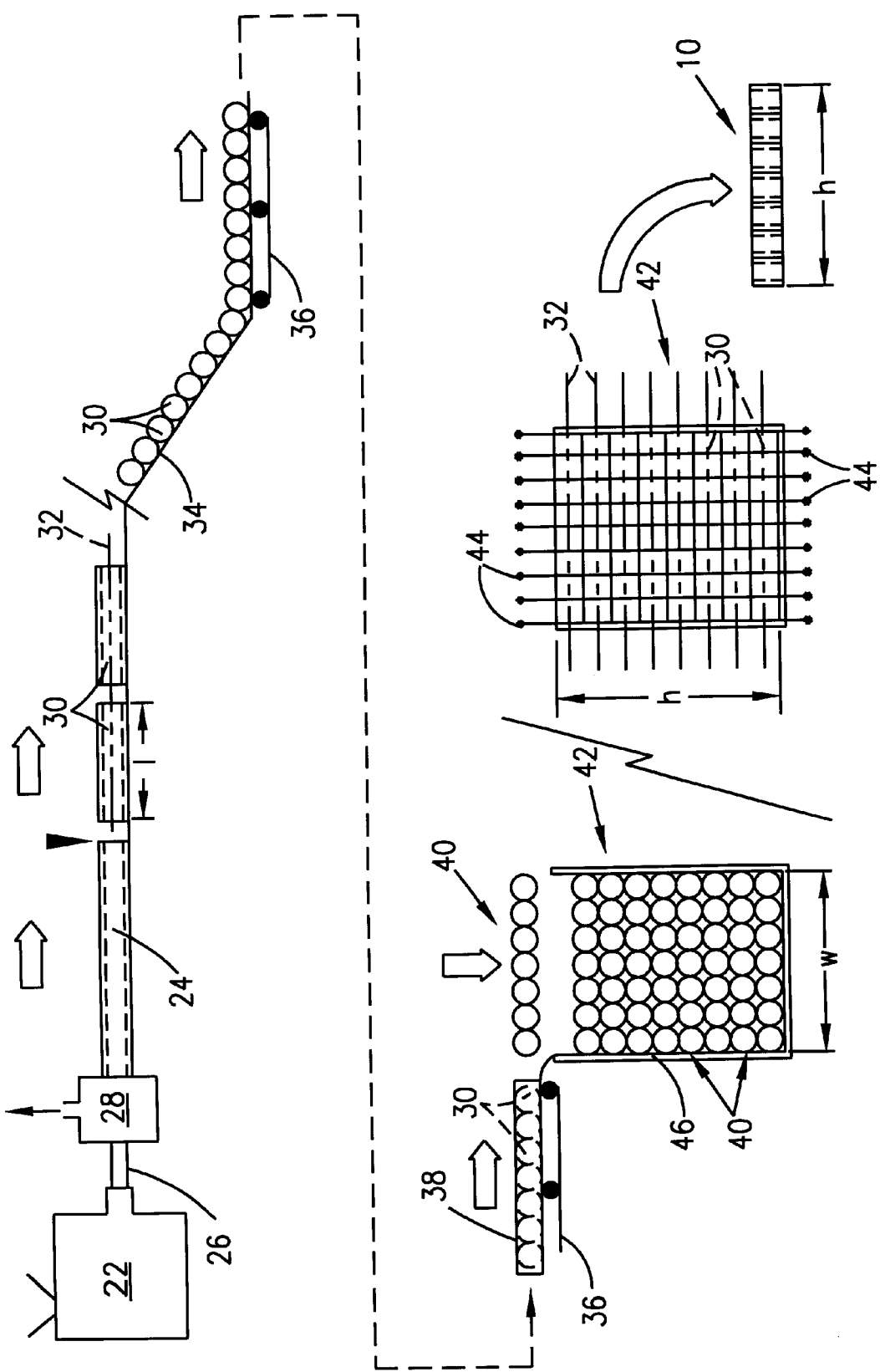
FIG. 7 is a schematic diagram showing the operational flow of a first embodiment of the method, in accordance with the present invention, of forming a structure suitable for use as a core member.
Figure 9:
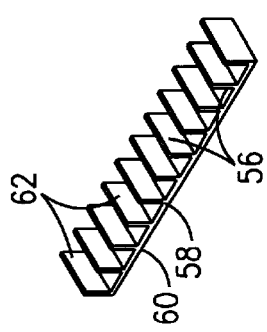
FIG. 9 is a three-dimensional view of another arrangement of a sheet structure suitable for use in carrying out the method embodying the present invention.
Figure 10:
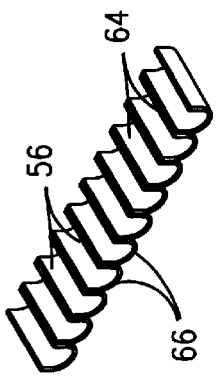
FIG. 10 is a three-dimensional view of another embodiment of a thermoplastic sheet structure suitable for use in a method of forming a structure in accordance the present invention.

In a first exemplary preferred embodiment of a method, in accordance with the present invention, of forming a structure 10, a thermoplastic material is discharged from an extruder 22 as an elongated tubular shape 24 as shown schematically in FIG. 7. Extrusion is a well known process in which a hot or cold semi-soft solid material, such as metal or plastic, is forced through the orifice of a die to produce a continuously formed piece having a substantially uniform cross-section in the shape of the desired product. The tubular shape 24 is illustrated and used herein in a generic sense and may encompass any one or more tubular shapes such as the aforementioned cross sections, or other variations and alterations of such cross sections. In shapes having hollow cross sections, it is highly desirable to extrude the thermoplastic material as a solid rod 26 and then shape the exterior wall of the tubular shape 24 by expanding the solid rod 26 in a vacuum sizer 28 which simultaneously forms a hollow void in the center of the extruded shape 24. The extruded shape 24, either with or without vacuum sizing is allowed to cool, or actively cooled, to a temperature at which it is self supporting and can be readily cut into separate segments 30, each having a preselected length and a longitudinal axis 32 extended along the preselected length of the segments 30. The cutting operation may advantageously be accomplished by a rotating blade which rotates at a speed coordinated with the extrusion rate of the tubular member 24 so that each segment 22 has substantially the same length, end-to-end.

The cut segments 30 are then aligned in side-by-side relationship along their preselected lengths. As shown in the schematic diagram of FIG. 7, the cut segments 30 are aligned while moving along an inclined guideway 34 in which sides of the guideway converge toward a spaced-apart distance that is substantially equal to the preselected length of the segments 30. Therefore, the segments 30 are self-aligned as they pass down the inclined guideway 34. As an aid to movement of the segments 30, the guideway 34 may have a vibrated surface which agitates the segments 30 to aid in the movement and alignment of the segments 30. Alternatively, the guideway 34 may use means other than gravity to the segments 30 toward the right, as viewed in FIG. 7, such as by a moving belt 36, or an air assist.

A preselected number of the aligned segments 30 are then formed into a row 40 having a preselected width, determined by the number of aligned segments 30 that are in abutting contact with each other along the width of the row 40. The rows 40 of aligned segments may be formed by fusing at least one of the cut ends of each of the aligned segments with an adjacently disposed one of the segments 30. The fusing of the cut ends may be accomplished by heating the ends to a temperature sufficient to at least partially melt the cut ends of the aligned segments 30 to a temperature sufficient to at least partially melt the ends. This can be accomplished by a heated wire, by a heated plate 38 as shown in FIG. 7, or by other heat sources such as a laser or ultrasound. Alternatively, the cut ends of the aligned segments 30 may be mechanically bonded together by passing an abrasive surface or mechanical cutting tool across the ends of the segments 30 which make up one row 40 of the segments 30. The rows 40 of the aligned segments 30 are then assembled, one on top of another, to form a stack 42 of rows 40. Alternatively, the stack 42 may have the rows 40 aligned vertically in abutting relationship with one another. As illustrated in FIG. 7, the stack 42 has a width w substantially equal to the width of the rows 40, a depth substantially equal to the preselected length 1 of the segments 30 and a height h determined by the number of rows 40 of aligned segments assembled in the stack 42.

The stack 42 of assembled rows 40 of segments 30 (shown rotated 90 degrees for clarity) is then cut along lines that lie in a direction transverse to the longitudinal axis 32 of the aligned segments 30 at a plurality of spaced-apart distances along the longitudinal axes 32. Advantageously, the cutting may be accomplished by a plurality of heated wires 44 that, as also described below, simultaneously fuses adjacently disposed cut ends of the segments 30 to each other without substantially reducing the open cross-sectional area of the cut ends of the segments as illustrated in the end step of FIG. 7. The spaced-apart distances of the cuts will determine the final thickness of the structure 10. For example, if the assembled stack 42 has a width of forty-eight inches, a length of forty-eight inches, and a height of forty-eight inches, and it is desired that the resultant structures 10 have a thickness of one inch, the heated wires 44 would be spaced one inch apart. Thus, a 4.0 ft.×4.0 ft.×4.0 ft. stack 42 will yield forty-eight one-inch thick structures 10 having a 4.0 ft.×4.0 ft. height and width.

Alternatively, instead of using hot wires 44, other thermal cutting methods may be used, such as laser, a heated blade, a saw blade which is able to provide sufficient heat to both cut and fuse the cut ends of the segments 30, or other methods.

If desired, the rows 40 of assembled segments 30 may be assembled into a stack 42 by placing the rows 40 into a consumable container 46 formed of a material that is capable of being kept by a thermal apparatus, such as the aforementioned heated wire. Desirably, the consumable container 46 is formed of an expanded or foamed plastic material that is readily cut by a heat source, such as expanded polystyrene. Other materials suitable for construction of the consumable container 46 include reprocessed scrap tubes, cardboard, and polyethylene.

In making the final transverse cuts of the stacked rows 40, it may be desirable to simultaneously cut the outer ends of each of the elongated segments 30 to assure that the outer structures 10 have a uniform thickness and an open cross-sectional area at the cut ends substantially equal to the open cross-sectional area at any point along the length of the elongated segments 30, as illustrated in the end step of FIG. 7. This could also compensate for any misalignment of the segments 30 which may result in an uneven surface on the outermost structures 10. Also, as described below in greater detail, the consumable container 46, if desired, may be wrapped in a heat-shrinkable plastic material prior to cutting the stack of assembled rows.

When using a thermal apparatus, such as the aforementioned hot wire 44 or other apparatus, the heat produced by the thermal apparatus should be such that it not only cuts i.e., severs, the segments 30 contained within the stack 42, but also provides sufficient heat to at least partially melt the cut ends of the segments 30 and fuse the ends of adjacent cut segments to each other. If it is desired to later use the structure 10 in a panel assembly that has curved surfaces, or for other uses in which a curved core is desired, one surface of the structure 10 should be fused and the opposite surface of the structure 10 not fused, i.e., the open ends of the segments 30 not joined together. This can be easily accomplished using the method embodying the present invention. For example, during the cutting operation illustrated at the right end of the schematic diagram of FIG. 7, the temperature of the hot wires 44 can be controlled so that one set of wires has a temperature sufficient to cut and fuse the cut ends of the segments 30, whereas an alternating set of the hot wires 44 has a temperature sufficient to only cut the segments 30 without fusing the cut ends. For example, the first hot wire 44, positioned at the left end of the stack 42, may be controlled to have a temperature sufficient to not only cut the ends of the segments 30, but also to fuse the cut ends, whereas the second wire 44 from the left end may be controlled to a temperature sufficient to only cut the segments 30. In like manner, the third wire 44 from the left end may be controlled to a temperature sufficient to cut and fuse the segments 30. Thus, the two left-hand structures 10 severed from the stack 42 each have one surface at which the cut segments are fused and an opposite surface at which the cut segments are not fused together. This permits the structure 10 to be bent in a shape where the uncut surface can be curved into a convex curve, with the corresponding fused surface curved into a concave curved surface shape.

Figure 12:
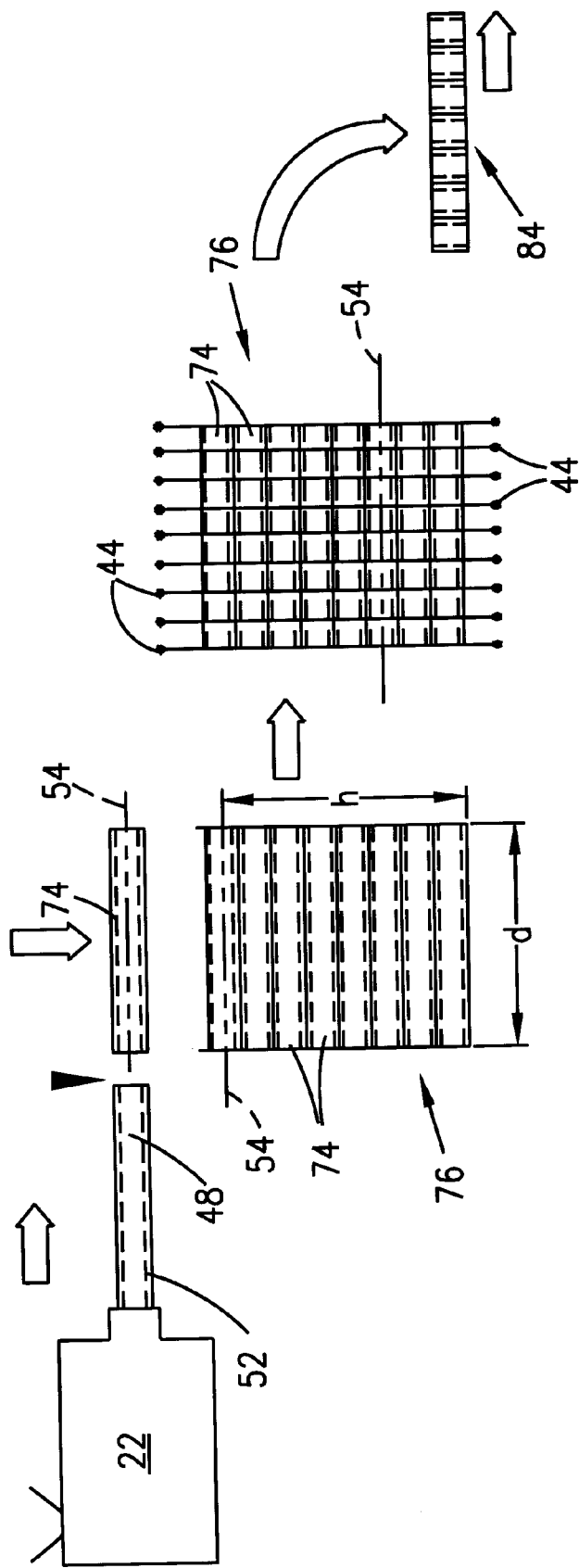
FIG. 12 is a schematic diagram of another embodiment of the method of forming a structure suitable for use as a core member, in accordance with the present invention.

In a second preferred embodiment forming a structure 10, according to the present invention, suitable for use as a core member, a continuous thermoplastic sheet 48, having a predefined width w, is used in the initial step of the method as illustrated in FIG. 12. In a first embodiment illustrated in FIG. 8, a thermoplastic sheet 48 desirably has a plurality of uniformly open cross-sectional area elongated passageways 52 that are disposed in parallel relationship with at least one continuous surface 50 of the sheet 48 and with each other. Each of the elongated passageways 52 have a longitudinal axis 54 that is disposed perpendicular to the direction of the width W of the sheet 48.

Figure 11:
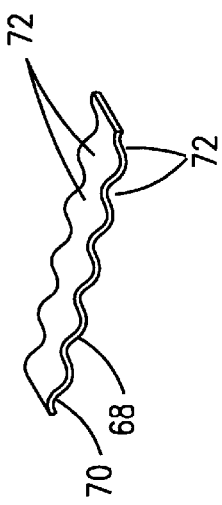
FIG. 11 is a three-dimensional view of yet another thermoplastic sheet structure suitable for use in a method of forming a structure, in accordance with the present invention.
Figure 8:
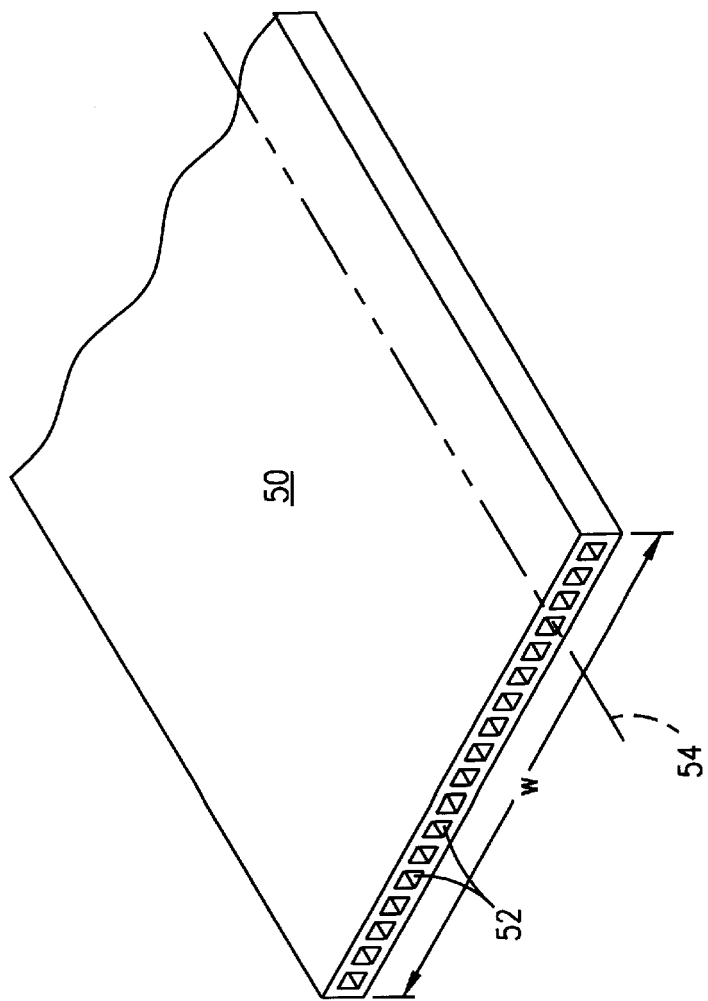
FIG. 8 is a three-dimensional view of a thermoplastic sheet structure used in one embodiment of the method of forming a structure suitable for use as a core member, in accordance with the present invention.

Alternate forms of the thermoplastic sheet 48 are shown in FIGS. 8–11. In FIG. 8, the longitudinal passageways 52 have a substantially uniform hollow rectangular cross-section. Other shapes of hollow cross sections may be formed between the pair of planar surfaces of the sheet 48 and include hollow circular cross sections, hollow triangular cross sections, hollow hexagonal cross sections, and other arrangements as described above with respect to the elongated tubular extruded shapes 24. In the structure shown in FIG. 9, the elongated passageways 56 are at least partially formed by a base wall 58 having a first side 60 which defines the surface extending across the width of the thermoplastic sheet, and by plurality of spaced-apart parallel walls 62 that extend from a second side of the base wall 58 in a direction normal to the base wall 58. The upper portion of the passageways 56 are closed when a second sheet is assembled on top of the first sheet, thereby completing the enclosure around the passageway 56. Another arrangement of the thermoplastic sheet, illustrated in FIG. 10, has the form of a series of adjacently disposed U-shaped channels 64 wherein the bottom of the U-shaped channels 64 define a surface 66 extending across the width of the sheet. In FIG. 11, the thermoplastic sheet is defined by one side 68 of a serpentine wall 70 and elongated passageways 72 are defined by alternating convex and concave curved portions on respective sides of the serpentine wall 70. The serpentine wall 70 extends across the width of the thermoplastic sheet.

After being expelled from the extruder 22, a thermoplastic sheet such as the sheet 48 shown in FIG. 8, is either passively or actively cooled and cut transversely across the width of the sheet 48 to form a plurality of separate plates 74, as shown schematically in FIG. 12. The plates 74 each have a preselected length 1 extending in a direction parallel to the longitudinal axes 54 of the passageways 52. The separated plates 74 are then assembled one on top of another to form a stack 76 having a width substantially equal to the width of the plates 74, a depth d substantially equal to the preselected length 1 of the plates 74, and a height h determined by the number of plates 74 assembled in the stack 76. The stack 76 of assembled plates 74 are then simultaneously cut at a plurality of locations, in a direction transverse to the longitudinal axes 54 of the elongated passageways 52. The multiple cutting operation divides the stack 76 into a plurality of separate structures 84, as illustrated in plan view in FIG. 17. Each of the structures 84 have a width and height substantially equal to the width and height of the stack 76, and a thickness determined by the preselected distance between the transverse cuts through the stack 76. As described above, desirably the stack 76 is simultaneously cut by a plurality of hot wires 44 drawn through the stack 76 whereat the spacing between the wires 44 determines the thickness of the severed structure 84. Also, as described above and illustrated in the last step shown in FIG. 12 and in FIGS. 16 and 17, the cut ends of the plates 74 are desirably fused together without substantially reducing the open cross-sectional area of the cut ends at at least one surface of the structure 84. The temperature of the hot wires 44 drawn through the stack 76 will determine whether the plates 74, at that transverse location, are merely cut or cut and simultaneously fused to adjoining plates 74.

Prior to cutting the assembled plates 74, the plates 74 may be stacked in a holder, or structure 78, as illustrated in FIG. 14, that has side openings and a bottom clearance provided therein which provide access to a stack 76 of plates 50 assembled within the holder 78, for wrapping at least one band of a plastic material around the stack 76. Preferably, the plastic material is a heat-shrinkable film. Heat-shrink wrapping is generally defined as a plastic film having preformed strains in which the strains are released by raising the temperature of the film, causing the film to shrink-fit around an object about which it is wrapped, i.e., the stack 76.

Thus, it can be seen that the above method provides a structure, or member, 84 as illustrated in FIG. 17, suitable for use as a core having a plurality of adjacently disposed rows 40 of thermoplastic plates 74 in which the passageways 52 in the rows 40 are disposed in a direction normal to the thickness of the member 84. Each of the thermoplastic plates 74 have a predefined width, at least one surface extending across the width of the plate 74, and a plurality of elongated passageways 52 disposed in parallel relationship with at least one surface 60 of the member 84 and with each other. Also, each of the elongated passageways 52 have a longitudinal axis 54 that is perpendicular to the direction of the width of the plate 74. Each of the plates 74 have spaced apart ends 53, one of which is visible in FIG. 17. Thus, the end portions 53 are perpendicular to the width of the plate structures 74. Importantly, a portion of at least one end portion 53 of each row 40 adjacent the broad surface of the member 84 is fused with an end portion 53 of an adjacently disposed row 40 of the thermoplastic plates 74. As described above, and illustrated in FIG. 17, the ends of the passageways 52 are not deformed during the cutting and fusing operation, i.e., the cut ends of each of the passageways 52 have an open cross-sectional area substantially equal to the open cross-sectional area at any point along the length of the passageway 52. It can also be readily seen that the member 84 may have any of the cross-sectional shapes described above with respect to the tubular shapes 24 and the thermoplastic sheets 48.

In a third embodiment of the method, embodying the present invention, of forming a structure 10 suitable for use as a core member, separate segments 30 are provided as described above, by extruding a thermoplastic material into an elongated tubular shape 24, cutting the elongated tubular shape 24 into a plurality of separate segments 30 which have a preselected length and a longitudinal axis 32, and aligning the separate segments 30 in side-to-side relationship along their preselected lengths as shown in FIG. 15. The elongated tubular shape 24 may have any of the above-described cross-sectional shapes, and as an aid to aligning the separate segments 30, the segments 30 may be moved along a guideway 34 as described above, which has side walls that converge to a spaced-apart distance substantially equal to the length of the segments 30. If desired, either the guideway 34 or the segments 30 may be agitated during movement to assure that the segments 30 are aligned in abutting relationship with each other along their lengths.

The aligned separate segments 30 are then shrink-wrapped by a heat-shrinkable film 80 whereby a consolidated bundle of shrink-wrapped segments 30 is provided. The bundle may then be simultaneously cut at a plurality of spaced-apart locations, in a direction transverse to the longitudinal axes 32 of the segments 30 as described above. Thus, a plurality of separate shrink-wrapped structures 10 which have a film 80 of the shrink wrapping around the exterior periphery of the structure 10 as illustrated in FIG. 16. It has been found that the shrink-wrapping film 80 can be readily cut by the thermal devices, such as the hot wires 44 used to cut and/or fuse the thermoplastic segments 30 or plates 50.

In a fourth preferred embodiment of the method of forming a structure 10, in accordance with the present invention, that is suitable for use as a core member, a thermoplastic material is extruded into an elongated tubular shape 24 as described above. Also, as described above, the elongated tubular shapes 24 are then cut into a plurality of separate segments 30, each having a preselected length 1 and a longitudinal axis 32. The separate segments 30 are then aligned in side-by-side relationship along their respective lengths, as described above, and deposited into a consumable container 82, as illustrated in FIG. 13. The consumable container is desirably formed of expanded polystyrene or other material that can be readily cut by thermal apparatus, such as a hot wire 44.

After being deposited in the consumable container 82, as shown in FIG. 13, the separate segments 30 and container 82 can be simultaneously cut in a direction transverse to the longitudinal axes of the aligned segments 30 at a plurality of preselected spaced-apart distances in a direction along the longitudinal axes 32 of the segments 30. This operation, as described at various points above, forms a plurality of separate structures 10 each having a thickness determined by the preselected distance between the transverse cuts. Simultaneously, depending upon the temperature of the thermal device, selected cut ends of the segments may be fused with an adjacently disposed cut end at at least one other segment 30. In this method, the elongated tubes 24 may have any of the cross-sectional shapes defined above although, for ease of the description in the schematic diagrams, a circular cross section has been used for illustrative purposes in the drawings. Also, the method described immediately above may include agitating the segments 30 along a guideway 34, as shown in FIG. 7, during moving the segments 30 along the guideway 34 for the purpose of aligning the ends of the segments 30 and positioning the segments 30 in abutting side-by-side relationship.

Thus, it can be seen that by the methods described above, that a structure 10, or plate 84, can be easily formed in an economical manner. The methods described herein do not require adhesive joining or the use of a gutter or trough-like fixture to hold an aligned bundle of tubular segments as they are cut, a single pass at a time. Forming only a single structure at a time is time consuming and labor intensive. Moreover, increased handling of the segments during multiple single step cutting operations can lead to misalignment of the segments between successive cuts.

Although the present invention is described in terms of preferred exemplary embodiments, with specific illustrative shapes of tubular members and thermoplastic sheet structures and suitable thermoplastic materials, those skilled in the art will recognize that changes in those shapes, arrangements and materials may be made without departing from the spirit of the invention. Such changes are intended to fall within the scope of the following claims. Other aspects, features, and advantages of the present invention may be obtained from a study of this disclosure and the drawings, along with the appended claims.

What we claim is:

1. A member suitable for use as a core, said member having a pair of spaced apart surfaces defining the thickness of the member, said member comprising:

a plurality of adjacently disposed rows of preformed thermoplastic plate structures, said rows of preformed plate structures being disposed in a direction normal to the thickness of the member, each of said plate structures having a predefined width, at least one continuous surface extending across said width, spaced apart ends each having an end portion perpendicular to said width, and a plurality of elongated passageways disposed in parallel relationship with said at least one surface and with each other, each of said elongated passageways having a longitudinal axis perpendicular to the direction of width of said plate, and a uniform cross-sectional area along the length of the passageway;

wherein only the end portion of at least one of said spaced apart ends of each plate structure is fused with only the end portion of at least one of said spaced apart ends of an adjacently disposed thermoplastic plate structure, and the open cross-sectional area of the passageways at each of the spaced apart ends is the same as the open cross-sectional area at any point along the length of said passageways.

2. A member, as set forth in claim 1, wherein said fused portions of said surfaces of adjacently disposed rows of the thermoplastic plate structures are positioned at at least one of the pair of spaced apart surfaces defining the thickness of said member.

3. A member, as set forth in claim 1, wherein said passageways have a hollow rectangular cross section.

4. A member, as set forth in claim 1, wherein said passageways have a hollow triangular cross section.

5. A member, as set forth in claim 1, wherein said passageways have a hollow circular cross section.

6. A member, as set forth in claim 1, wherein said passageways have a hollow hexagonal cross section.

7. A member, as set forth in claim 1, wherein said passageways have at least one transversely disposed internal wall forming a plurality of separate elongated hollow cells extending along the longitudinal axis of each of said passageways.

* * * * *

UNITED STATES PATENT AND TRADEMARK OFFICE
CERTIFICATE OF CORRECTION

PATENT NO. : 6,199,342 B1
DATED : March 13, 2001
INVENTOR(S) : Court et al.

It is certified that error appears in the above-identified patent and that said Letters Patent is hereby corrected as shown below:

<u>Column 4,</u>
Line 41, replace "hand" with -- band --

<u>Column 7,</u>
Line 24, insert -- w -- after the word "width"

<u>Column 9,</u>
Line 28, insert -- w -- after the word "width"

Signed and Sealed this

Nineteenth Day of March, 2002

Attest:

JAMES E. ROGAN
Attesting Officer    Director of the United States Patent and Trademark Office